April 12, 1932. W. A. HUMPHREYS 1,853,307
PLOW
Filed Jan. 2, 1930
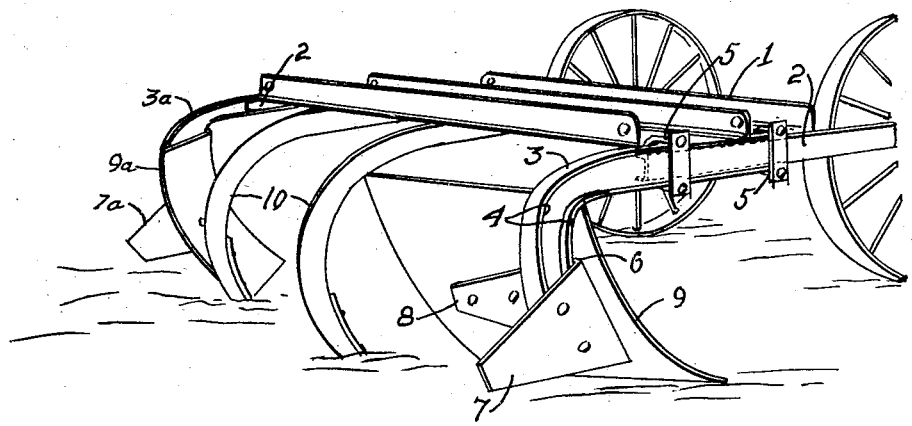
INVENTOR
William A. Humphreys
John A. Naismith
ATTORNEY Patented Apr. 12, 1932

1,853,307

UNITED STATES PATENT OFFICE

WILLIAM A. HUMPHREYS, OF MORGAN HILL, CALIFORNIA

PLOW

Application filed January 2, 1930. Serial No. 418,106.

This invention relates particularly to a means for shifting the loose earth away from or toward adjacent rows of growing plants.

In the cultivation of the grape, as well as in the cultivation of other crops where the growing plants are disposed in equally spaced parallel rows, it is ordinarily necessary to work back and forth a number of times between adjacent rows, first working the earth away from the rows and then throwing it back again to its original substantially level condition.

It is one object of the present invention to provide a means whereby the soil may be shifted in one direction relative to the opposing sides of adjacent rows of plants in one operation and then shifted in the opposite direction in a second operation.

It is also an object of the invention to provide a means of the character indicated that may be used in conjunction with a standard earth working tool, such as a cultivator, whereby the soil between the rows may be worked while the above mentioned operations are being performed.

It is still another object of the invention to provide means of the character indicated that may be readily mounted upon or removed from a standard earth working tool, or shifted from one side to the other thereof.

Finally, it is an object of the invention to provide a means of the character indicated that will be economical to manufacture, simple in form and construction, strong, durable, and highly efficient in its practical application.

In the drawing, the figure is a perspective illustration of a portion of a cultivator embodying my invention.

Referring now more particularly to the drawing, I show at 1 a portion of a cultivator having the usual side bars 2.

At 3 I show a plow beam provided with flanges as at 4 adapted to engage the upper and lower edges of beam 3 and rigidly secured thereto by means of the collars 5.

The rear end of beam 3 curves downwardly as shown and has an angular plate 6 mounted thereon, one portion of the plate extending rearwardly a distance as at 7 and facing outwardly to form a landside, and the other portion extending inwardly at substantially right angles to the first portion as at 8 to form a support for the moldboard. Mounted upon the part 8 is the downwardly and forwardly curving sheet metal element 9 which forms a share and moldboard inclining rearwardly from its outer edge.

As the invention is herein disclosed a similar plow structure is shown at 3a, 7a, 9a, but this structure is oppositely directed to the one above described and mounted upon the opposite side of the cultivator so that as the cultivator advances the earth is thrown inwardly from both sides and consequently away from the plants. At the same time that this work is being done the soil between the rows is being worked by cultivator teeth as 10. When the ground has been gone over in this manner it is only necessary to change the positions of the plow structures and go over the ground again whereupon the reversed plow structures throw the earth back along the rows and the cultivator teeth again stir the soil between the rows.

From the foregoing it may be readily seen that I have provided a means for effectually disposing the soil as desired with comparatively little expense of time and labor and consequently in a very economical manner as compared with the usual system. Furthermore the means provided is simple in form and construction, quickly and easily mounted on any desired draft machine, strong, durable and efficient.

It is to be understood, of course, that while I have herein shown and described but one specific embodiment of the invention, changes in form, construction, and method of arrangement and application may be made within the scope of the appended claim.

I claim:

In a structure of the character described, the combination of a cultivator frame and a plow beam having a downwardly curved end portion detachably mounted on each side thereof, an angular plate mounted on the curved end portion of each plow beam, one portion of the plate overlying one side of the beam and extending rearwardly therefrom to form a landside and the other portion extending laterally at substantially right angles to the first portion to form a support for a moldboard, a forwardly curved sheet metal share and moldboard mounted on the forwardly directed face of the second mentioned portion of the angular plate, and inclining rearwardly from the edge adjacent the first mentioned portion of the plate, and cultivator teeth mounted on the frame between the plow beams.

WILLIAM A. HUMPHREYS.